United States Patent
Sarasamma

(10) Patent No.: US 11,061,926 B2
(45) Date of Patent: Jul. 13, 2021

(54) DATA WAREHOUSE MANAGEMENT AND SYNCHRONIZATION SYSTEMS AND METHODS

(71) Applicant: Target Brands, Inc., Minneapolis, MN (US)

(72) Inventor: Deepa Sarasamma, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 361 days.

(21) Appl. No.: 16/150,086

(22) Filed: Oct. 2, 2018

(65) Prior Publication Data
US 2020/0104405 A1    Apr. 2, 2020

(51) Int. Cl.
| | |
|---|---|
| G06F 16/27 | (2019.01) |
| G06Q 10/08 | (2012.01) |
| G06F 16/242 | (2019.01) |
| G06F 16/25 | (2019.01) |
| G06F 16/28 | (2019.01) |
| G06F 16/2455 | (2019.01) |

(52) U.S. Cl.
CPC ............ *G06F 16/27* (2019.01); *G06F 16/244* (2019.01); *G06F 16/24568* (2019.01); *G06F 16/254* (2019.01); *G06F 16/283* (2019.01); *G06Q 10/087* (2013.01)

(58) Field of Classification Search
CPC ...... G06F 16/27; G06F 16/244; G06F 16/254; G06F 16/283; G06F 16/24568; G06F 16/273; G06Q 10/087

USPC .................................................. 707/600, 610
See application file for complete search history.

(56) References Cited

U.S. PATENT DOCUMENTS

| | | | |
|---|---|---|---|
| 5,680,602 A | 10/1997 | Bloem et al. | |
| 5,806,075 A * | 9/1998 | Jain | ......................... G06F 16/27 |
| 6,405,212 B1 | 6/2002 | Samu et al. | |
| 6,502,093 B1 | 12/2002 | Bhatt et al. | |
| 7,031,974 B1 | 4/2006 | Subramaniam | |

(Continued)

OTHER PUBLICATIONS

Randy Urbano. "Streams Replication Administrator's Guide". Aug. 2008. httpsdocs.oracle.com/cd/B283259_01/server.111/b28322/toc.htm. Section 1 Understanding Oracle Streams Replication. Examiner annotated pp. 1-23. Accessed Nov. 20, 2020. (Year: 2008).*

(Continued)

*Primary Examiner* — Michael Pham
(74) *Attorney, Agent, or Firm* — Merchant & Gould P.C.

(57) ABSTRACT

Methods and systems for managing synchronization among databases are described. One method includes establishing a trigger within a transactional database storing a plurality of transaction records, the trigger having a trigger condition associated with storing a new transaction record in the transactional database. The method includes, in response to each occurrence of the trigger condition, storing a primary key of the new transaction record into a primary key table. The method also includes aggregating transaction record information into a transaction dataset, the transaction record information being from each of a plurality of transaction records that are associated with primary keys stored in the primary key table during a predetermined time period; and transmitting the transaction dataset to a remote analysis database as streaming data.

17 Claims, 5 Drawing Sheets

(56) References Cited

U.S. PATENT DOCUMENTS

| | | |
|---|---|---|
| 7,783,601 B2 | 8/2010 | Wong et al. |
| 7,814,470 B2 | 10/2010 | Mamou et al. |
| 8,655,836 B2 | 2/2014 | Ding |
| 2002/0143669 A1 | 10/2002 | Scheer |
| 2005/0235274 A1 | 10/2005 | Mamou et al. |
| 2009/0125563 A1* | 5/2009 | Wong .................... G06F 16/256 |
| 2009/0292745 A1* | 11/2009 | Bose ...................... G06F 16/27 |

OTHER PUBLICATIONS

Oracle 7 Server Concepts Manual—Database Triggers, Dated Mar. 10, 2017, 12 Pages.
Oracle 7 Server Concepts Manual—Using Database Triggers, Dated Mar. 19, 2017; 23 Pages.
Microsoft MSDN; Create Trigger (Transact-SQL), Dated Mar. 19, 2017; 16 Pages.
Oracle Help Documentation; Generating Outbound Interface Triggers; Dated Mar. 19, 2017; 5 Pages.
IBM Knowledge Center: Database Trigger Tables; Dated Mar. 19, 2017; 1 Page.

\* cited by examiner

DATA WAREHOUSE MANAGEMENT AND SYNCHRONIZATION SYSTEMS AND METHODS

BACKGROUND

Existing data warehouses are often characterized as transactional or relational, or some combination of each. Transactional data warehouses or databases are designed to receive data updates frequently, while non-transactional data warehouses are updated less frequently, but may be used for other reasons, such as business planning and analysis.

It is desirable for business planning and analysis to occur on data that is as up to date as possible; however, due to the frequency with which updates occur to transactional data, up-to-date synchronization of analysis data is not always possible. Still further, for large scale organizations, transactional data is obtained at such a high volume that it may be difficult to aggregate that transactional data in a single transactional database; such organizations may use many different, geographically dispersed transactional database systems, and may have periods of high volume transactions, which may be unpredictable or may exceed available bandwidth for communication between transactional databases and analysis databases. This makes aggregation of transactional data for analysis even more difficult, not only because of the difficulties in writing data from many transactional databases into an analysis database, but also because of such bandwidth limitations. As such, neither continuous transfer of transaction data to an analysis database nor bulk data transfer, as may occur during database replication or export, may be suitable.

SUMMARY

In general, the present disclosure relates to methods and system for synchronizing data between transactional databases and an analysis database using database triggers to periodically aggregate and transmit portions of transaction records. The database triggers cause storage of primary key data in a primary key table, and that primary key table is periodically accessed to obtain a streaming dataset that is in turn streamed to an analysis database, where a streaming data ingest service will incorporate the data into that analysis database. This allows for selective synchronization of transaction records on a near-realtime basis to allow for analysis to be performed on up-to-date data.

In a first aspect, a data management computing system includes a transactional database comprising a plurality of transaction records hosted by a transactional database management system on a computing platform, and a primary key table managed within the transactional database. The data management computing system further includes one or more triggers instantiated in the transactional database management system, the one or more triggers being configured to cause the transactional database management system to store, for each transaction record written to the transactional database, a primary key in the primary key table. The system also includes a synchronization tool installed on the computing platform hosting the primary key table, the synchronization tool configured to periodically obtain a collection of aggregated primary keys, the aggregated primary keys being primary keys stored in the primary key table within a predetermined period of time and associated with transaction records written to the transactional database within the predetermined period of time. The system further includes a streaming data service configured to receive a portion of each of the transaction records associated with the aggregated primary keys, the streaming data service being triggered by the synchronization tool and causing transmission of a streaming dataset to an analysis database located remotely from the transactional database.

In a second aspect, a method of managing synchronization among databases are described. The method includes establishing a trigger within a transactional database storing a plurality of transaction records, the trigger having a trigger condition associated with storing a new transaction record in the transactional database. The method includes, in response to each occurrence of the trigger condition, storing a primary key of the new transaction record into a primary key table. The method also includes aggregating transaction record information into a transaction dataset, the transaction record information being from each of a plurality of transaction records that are associated with primary keys stored in the primary key table during a predetermined time period; and transmitting the transaction dataset to a remote analysis database as streaming data.

In a third aspect, a data management computing system includes a plurality of transactional databases each comprising a plurality of transaction records hosted by a transactional database management system, the transaction records comprising inventory management records. The system further includes a primary key table associated with each transactional database of the plurality of transactional databases, the primary key table managed within the associated transactional database. The system also includes one or more triggers instantiated in each transactional database management system, the one or more triggers being configured to cause the transactional database management system to store, for each transaction record written to the transactional database managed by that transactional database management system, a primary key in the associated primary key table. The system also includes an analysis database hosted remotely from the plurality of transactional databases and communicatively connected to the plurality of transactional databases via a network, wherein the network has a maximum bandwidth between the computing platform and the second computing platform that is below what would be required to replicate all transactional data from the plurality of transactional databases into the analysis database in realtime. The system includes a plurality of synchronization tools, each synchronization tool being associated with a different one of the plurality of transactional databases and hosting the primary key table, the plurality of synchronization tools each configured to periodically obtain a collection of aggregated primary keys, the aggregated primary keys being primary keys stored in the primary key table of the associated transactional database within a predetermined period of time. The system further includes a plurality of streaming data services, each streaming data service being associated with a different one of the plurality of transactional databases and configured to receive a portion of each of the transaction records associated with the aggregated primary keys of the associated transactional database, the streaming data service being triggered by the associated synchronization tool and causing transmission of a streaming dataset to an analysis database located remotely from the transactional database. The system also includes a streaming data ingest service configured to receive each of the streaming datasets associated with the plurality of transactional databases and provide the portion of each of the transaction records to the analysis database. The analysis database maintains a set of analysis records corresponding to the plurality of transaction records at each of the plurality of transactional databases on an at least near-realtime basis.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

In general, the present disclosure relates to methods and system for synchronizing data between transactional databases and an analysis database using database triggers to periodically aggregate and transmit portions of transaction records. The database triggers cause storage of primary key data in a primary key table, and that primary key table is periodically accessed to obtain a streaming dataset that is in turn streamed to an analysis database, where a streaming data ingest service will incorporate the data into that analysis database. This allows for selective synchronization of transaction records on an at least near-realtime basis to allow for analysis to be performed on up-to-date data.

Figure 1:
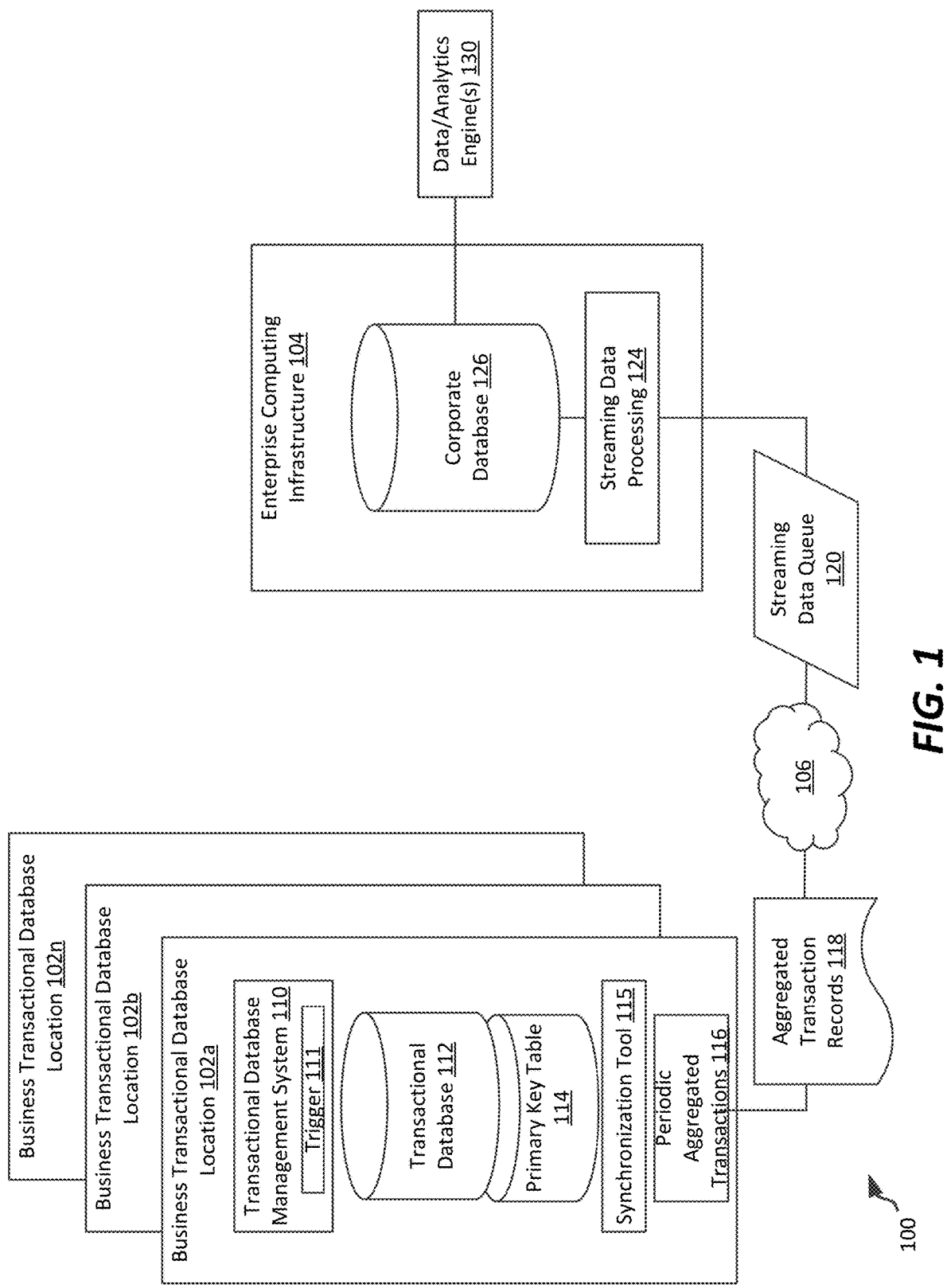
FIG. 1 illustrates an example data management computing system according to an example aspect of the present disclosure.

FIG. 1 illustrates an example data management computing system according to an example aspect of the present disclosure. In the example shown, a plurality of transactional database locations are included, shown as transactional database locations 102a-n (collectively referred to as transactional database locations 102). In example embodiments, the transactional database locations 102 correspond to collections of one or a plurality of computing systems (e.g., server farms, cloud compute clusters, etc.) in a generally common geographical area or which are configured to receive transaction records from other computing systems located at common geographical areas. As such, each of the transactional database locations 102 can gather transactional data from different geographical regions.

In one specific embodiment, each of the transactional database locations 102 receives and stores transaction data associated with inventory transactions (e.g., sale, purchase, move between stores, distribution centers, etc.) to track locations of inventory within a supply chain network of an enterprise. Of course, other transactional data could be stored as well, or instead of such inventory information; for example, sales information, user activity information, or other types of information could be stored as well. In general, each of the transactional database locations 102 store transactional data on a near-continuous basis due to operation within a network of a large enterprise, such as a large retailer having online or numerous physical store locations. In such a context, the transactional database locations 102 each are configured for high-volume storage of transactional data.

In the embodiment shown, each transactional database locations 102 includes a transactional database 112 that is hosted and managed by a transactional database management system 110. Any of a variety of transactional database management systems can be used; in the context of inventory transaction tracking, in some embodiments the transactional database management system 110 can be a Manhattan Active software solution by Manhattan Associates of Atlanta, Ga. Other types of database management systems designed for transactional data (e.g., database solutions from Oracle, IBM, Microsoft, etc.) could be used as well.

Each of the transactional database locations 102 is communicatively connected to an enterprise computing infrastructure 104 via a network, e.g., the Internet. The enterprise computing infrastructure can likewise be a grouping or cluster of computing systems, such as the computing system described below in conjunction with FIG. 2. In the embodiment shown, the enterprise computing infrastructure 104 hosts a corporate database 126.

The corporate database 126 is, rather than being a transactional database configured to receive and commit transactions on a near-continuous basis, can be a database organized for purposes of analysis, such as a SQL database, Hadoop cluster, or other arrangement. Accordingly, in some embodiments, the corporate database 126 corresponds to an analysis database, as that term is used herein. For example, the corporate database 126 can be used by a data/analytics engine 130 for purposes of reporting, data analytics, determining data trends/predictions, calculating financial effects, or various other applications.

In the embodiment shown, the transactional database 112 stores transaction data received nearly continuously from external systems. As such, it may be difficult to simultaneously store such transaction data both in the transactional database 112 and in the corporate database 126, which is not constructed for continuous transaction commits to the database, especially since there may be a plurality of transactional databases 112 for each corporate database. This is particularly the case when an enterprise may wish to perform analysis across an entire company in at least near-realtime (i.e., on all transactions gathered within the last 1-3 minutes, for example). In some instances, even if the corporate database 126 had a structure that could accommodate ingestion of data at transactional data commitment rates, the corporate database would nevertheless not be able to obtain that data, since the enterprise computing infrastructure, and particularly connection to the network 106, may not accommodate a full communicative connection of all transaction data, particularly where transaction data is associated with a plurality of locations.

To address this issue, in the embodiment shown, the transactional database 112 is configured to include a primary key table 114, and the transactional database management system 110 is configured to include a trigger 111 that defines a trigger condition identifying a timing at which primary key values are stored in the primary key table. For example, the trigger 111 may indicate that at some time between receipt of a transaction record and storage of that transaction in appropriate tables of the transactional database 112, at least one field of the transaction record, which corresponds to a primary key of the transactional database 112, can also be stored in the primary key table 114.

In some instances, the trigger 111 may indicate to store a particular value into the primary key table 114 upon receipt of a transaction record; in other instances, the trigger may define a trigger condition to store the value into the primary key table 114 upon storage of the transaction record within the transactional database 112. However, regardless of how the trigger 111 is defined, each transaction record that is received and stored in the transactional database 112 by the transactional database management system 110 will cause storage of a primary key in the primary key table 114 based on that trigger.

In the embodiment shown, a synchronization tool 115 can be used to periodically aggregate transaction data for transmission to the enterprise computing infrastructure 104, and corporate database 126. In particular, the synchronization tool 115 is configured to monitor the primary key table 114 to generate a collection of periodic aggregated transactions 116. The periodic aggregated transactions 116 correspond to the transactions that occur during a period of time during which primary keys associated with those transactions are stored in the primary key table 114.

Figure 4:
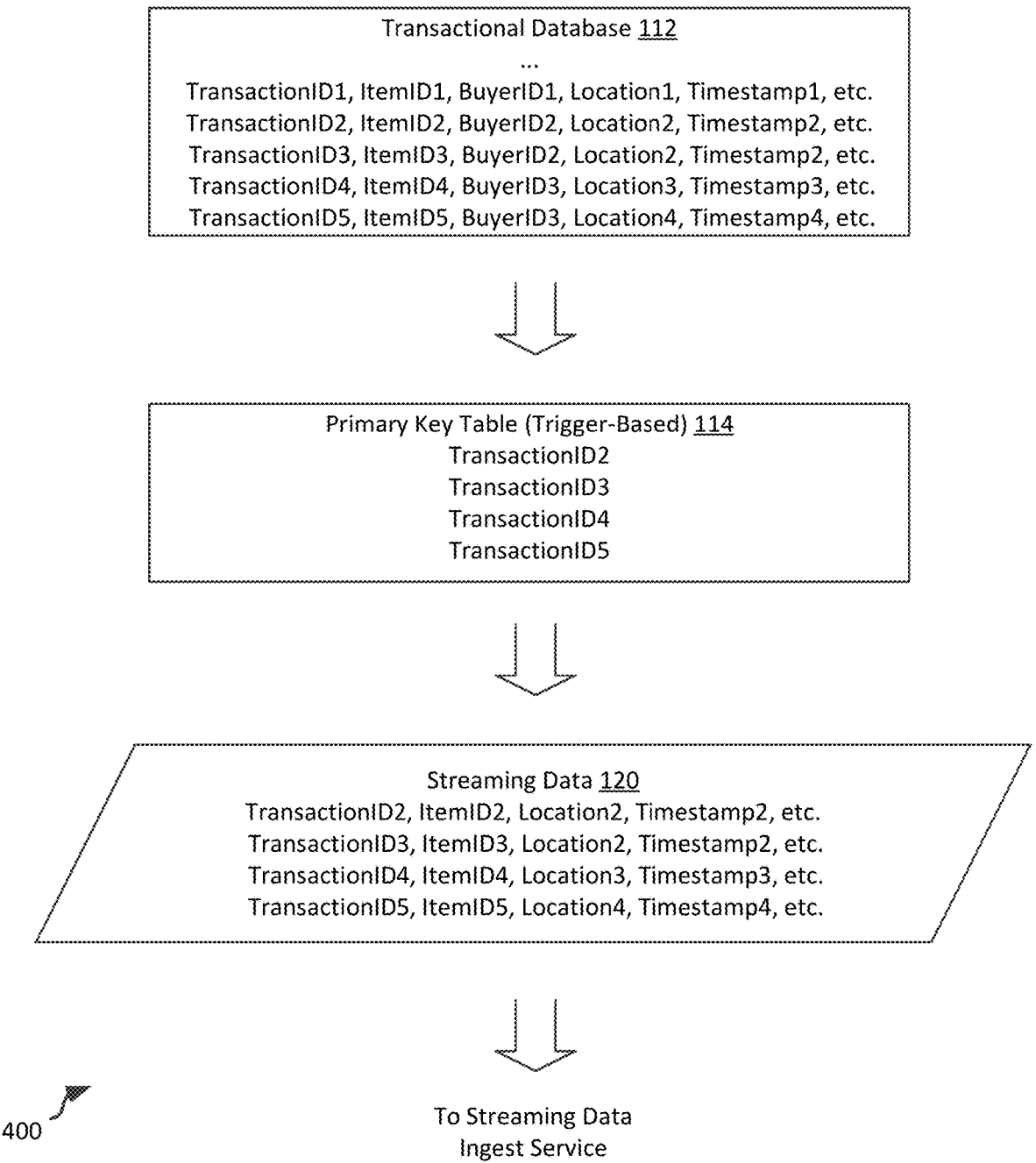
FIG. 4 is a data flow diagram illustrating export of transaction data to an analysis database and processing of that data for export.

The synchronization tool 115 can be configured to, once the periodic aggregated transactions 116 are collected, perform at least one data transformation on that data, and optionally merge and/or split such transaction data based on a perceived bandwidth of a connection between the location 102 and the enterprise computing infrastructure 104. For example, in some embodiments, the periodic aggregated transactions 116 are gathered every minute, and the primary key table is reset. The synchronization tool 115 may then mask personally identifiable information, or exclude that information entirely (as seen in FIG. 4). Such modification of transaction records may be solely for purposes of reducing the amount of data provided to the corporate database 126 for bandwidth purposes, or may also involve depersonalizing data as noted above.

The synchronization tool 115 may also wait until a predetermined number of records have been collected, up to a predetermined amount of time (e.g., 1-2 minutes or more). The periodic aggregated transactions 116 are therefore, when processed, merged into aggregated transaction records 118, and transmitted via network 106 to the enterprise computing infrastructure.

In example embodiments, the synchronization tool 115 may schedule synchronization of a streaming dataset based on a predefined, but modifiable schedule. In example embodiments, the synchronization tool utilizes a task scheduler, such as a "cron" job available within the Linux operating environment.

In example embodiments, the synchronization tool 115 can also act as a streaming data service, such as by publishing a streaming data topic that can be ingested by a streaming data ingest service 124. Such streaming data communication can be accomplished using the Apache Kafka distributed streaming platform, available from the Apache Software Foundation.

In various embodiments, the synchronization tool 115 can be tuned to ensure that the number of transaction records, and amount of data included in each of the transaction records, does not exceed the bandwidth available to provide data to the streaming data ingest service 124. In example embodiments, the aggregated transaction records are provided to the streaming data ingest service 124 via a streaming data queue 120, in an amount and frequency that is based on available bandwidth between locations 102*a-n* and the enterprise computing infrastructure 104 via the network 106. In example embodiments, a streaming data message can be limited in size based on an amount of data that can be transmitted via the network 106; for example, the streaming data message may be capped at 1 megabyte; in other implementations, other limits may be used, depending on a perceived bandwidth limitation (if any).

In some embodiments, the synchronization tool 115 publishes the streaming data queue 120 for ingestion; in alternative embodiments, the streaming data ingest service 124 can transmit a request for data to one or more of the locations 102*a-n* when a streaming data queue 120 is empty, indicating available bandwidth for data ingestion. Additional details regarding an example sequence with which transactions can be aggregated and processed is described below in further detail in conjunction with FIGS. 3-4.

Figure 2:
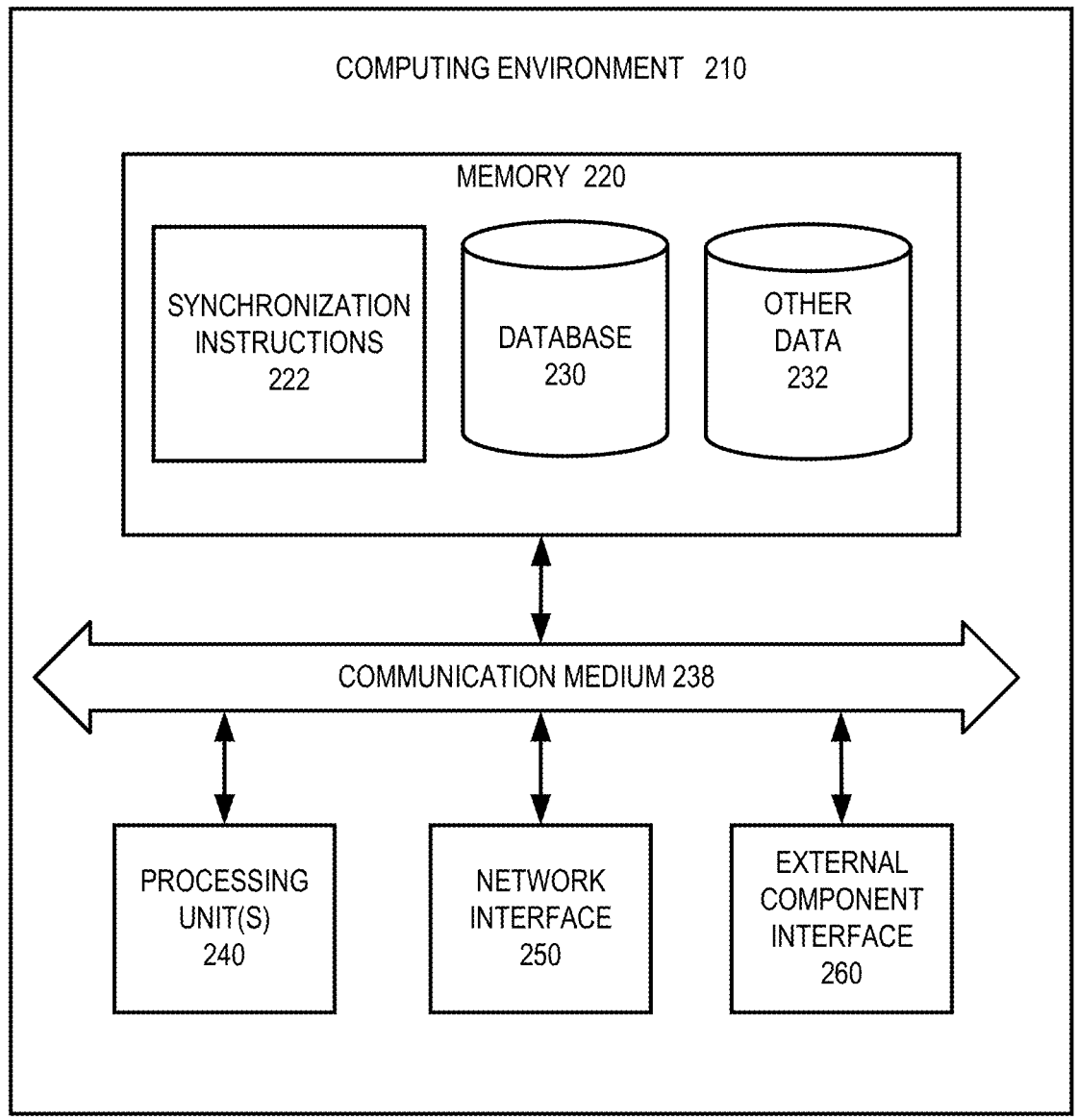
FIG. 2 illustrates an example computing system with which aspects of the present disclosure can be implemented.

FIG. 2 illustrates an example system 200 with which disclosed systems and methods can be used. In an example, the system 200 can include a computing environment 210. The computing environment 210 can be a physical computing environment, a virtualized computing environment, or a combination thereof. The computing environment 210 can include memory 220, a communication medium 238, one or more processing units 240, a network interface 250, and an external component interface 260.

The memory 220 can include a computer readable storage medium. The computer storage medium can be a device or article of manufacture that stores data and/or computer-executable instructions. The memory 220 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

The memory 220 can store various types of data and software. For example, as illustrated, the memory 220 includes synchronization instructions 222 for implementing one or more aspects of the data synchronization services described herein, database 230, as well as other data 232. In some examples the memory 220 can include instructions for managing storage of transactional data, such as retail or product inventory data.

The communication medium 238 can facilitate communication among the components of the computing environment 210. In an example, the communication medium 238 can facilitate communication among the memory 220, the one or more processing units 240, the network interface 250, and the external component interface 260. The communications medium 238 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 240 can include physical or virtual units that selectively execute software instructions. In an example, the one or more processing units 240 can be physical products comprising one or more integrated circuits. The one or more processing units 240 can be implemented as one or more processing cores. In another example, one or more processing units 240 are implemented as one or more separate microprocessors. In yet another example embodiment, the one or more processing units 240 can include an application-specific integrated circuit (ASIC) that provides specific functionality. In yet another example, the one or more processing units 240 provide specific functionality by using an ASIC and by executing computer-executable instructions.

The network interface 250 enables the computing environment 210 to send and receive data from a communication network (e.g., network 140). The network interface 250 can be implemented as an Ethernet interface, a token-ring network interface, a fiber optic network interface, a wireless network interface (e.g., WI-FI), or another type of network interface.

The external component interface 260 enables the computing environment 210 to communicate with external devices. For example, the external component interface 260 can be a USB interface, Thunderbolt interface, a Lightning interface, a serial port interface, a parallel port interface, a PS/2 interface, and/or another type of interface that enables the computing environment 210 to communicate with external devices. In various embodiments, the external component interface 260 enables the computing environment 210 to communicate with various external components, such as external storage devices, input devices, speakers, modems, media player docks, other computing devices, scanners, digital cameras, and fingerprint readers.

Although illustrated as being components of a single computing environment 210, the components of the computing environment 210 can be spread across multiple computing environments 210. For example, unless otherwise noted herein, one or more of instructions or data stored on the memory 220 may be stored partially or entirely in a separate computing environment 210 that is accessed over a network.

Figure 3:
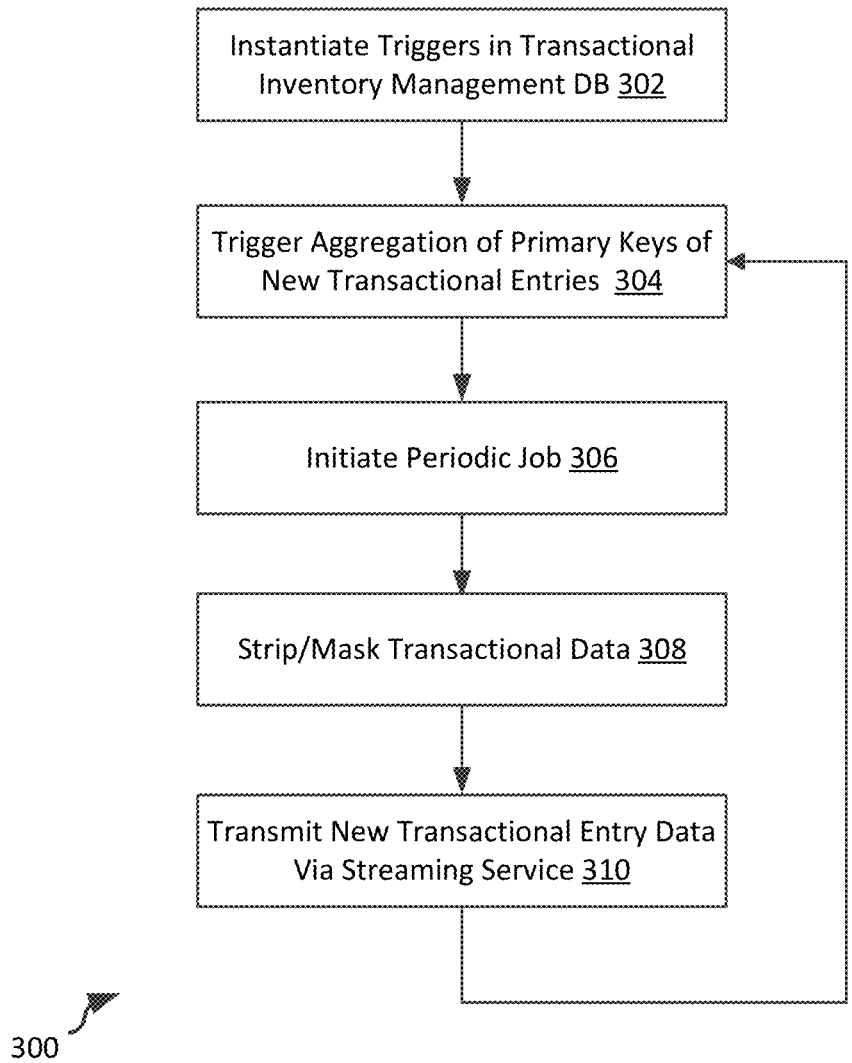
FIG. 3 is a flowchart of a method of exporting data from a transactional database, according to an example embodiment of the present disclosure.

Referring now to FIG. 3, a flowchart of a method 300 of exporting data from a transactional database, according to an example embodiment of the present disclosure. The method 300 can be performed within the data management computing system 100 of FIG. 1, using computing systems such as described in connection with FIG. 2.

In the embodiment shown, the method 300 includes instantiating one or more triggers in a transactional database, such as a transactional inventory management database (step 302). This can include, for example, setting a trigger condition for which a primary key entry is stored in a primary key table of a transactional database, such as the transactional database 112 of FIG. 1.

The trigger condition set can cause storage of a primary key upon receipt of a transaction record at the transactional database management system 110, or upon storage of the transaction record into the database, or other timing. The transaction record can take many forms. In example embodiments, the transaction record that is received for storage includes a transaction identifier as well as descriptive information associated with a transaction. In the case of inventory transactions, the transaction record can include an item identifier, a location identifier, a timestamp, a buyer identification, and optional additional descriptive information associated with the transaction identifier. Other data types could be included in the transaction record as well.

The method 300 also includes, during operation of such transactional databases to store transaction records, triggering storage of primary keys in a primary key table during a particular period of time (step 304). Generally, at the beginning of a primary key aggregation period, the primary key table may be reset, or may otherwise simply continue to aggregate primary keys, but will mark those primary keys that are associated with transaction records that have not yet been transmitted to an analysis database. Accordingly, as primary keys are stored in the primary key table, a set of primary keys is designated as associated with transaction records that have not yet been synchronized to an analysis database (e.g., either by being the only keys present in the primary key table or by not having been marked as already synchronized).

In the embodiment shown, a synchronization tool initiates a periodic job of aggregating transaction records that are associated with the to-be-synchronized primary keys in the primary key table (step 306). The synchronization tool will retrieve and aggregate those transaction records, and form a collection of transaction records for transmission to the analysis database. The synchronization tool can also delete the primary keys from the primary key table for which transaction records are retrieved, or otherwise mark those primary key entries as having been synchronized. In alternative embodiments, such primary key deletion or marking may be performed only upon transmission of a streaming dataset including data from the transaction records.

In the embodiment shown, the synchronization tool can modify the aggregated transaction records to format data to be transmitted to the analysis database in accordance with the requirements of that analysis database (step 308). This can include, for example, stripping personally-identifying information from transaction records, such as a buyer identifier, or otherwise masking that data. It can also include excluding data that is not required for storage in the analysis database, due to the organization managing the analysis database not requiring that information for analysis purposes (e.g., specific detail/comment data that may be included in a transaction record, but which is not amenable to analysis in the aggregate). By removing certain data when formulating a streaming dataset from transaction records, bandwidth consumption may be reduced.

Once any data is processed to form a streaming dataset, the new transactional data entries are transmitted to the analysis database via a streaming data service (step 310). As noted above, this can be accomplished via a synchronization tool and usage of an instance of the Apache Kafka distributed streaming platform, available from the Apache Software Foundation.

Once the streaming dataset is transmitted to the analysis database, operational flow returns to continue triggering aggregation of primary keys in the primary key table (at step 304) to process a next period of transaction records for synchronization to the analysis database. Accordingly, while transaction records are continuously received and stored at the transaction database, all or some portion of those transaction records can be delivered to the analysis database on a schedule that is managed according to the ability of a streaming service and bandwidth connection between databases to support that delivery. Accordingly, during times of high transaction counts (e.g., in a retail environment, during a high transaction season or time of day), undue burden is not provided on the connection between the transaction database and analysis database, since that connection may not be able to support the bandwidth required for all transactions to be delivered from one (or more) transaction databases to the analysis database.

FIG. 4 illustrates a data flow diagram 400 showing export of transaction data to an analysis database and processing of that data for export. In the example shown, hypothetical records in a transactional database 112 are illustrated. The example illustrates transaction records that may be tracked in the context of a large retail organization. In the example shown, each transaction record includes a transaction identifier, an item identifier, a buyer identifier, a location identifier, a timestamp, and various other relevant details (e.g., price, promotion in effect, method of payment, etc. From that information, a trigger can cause storage of a primary key of that transaction record, in the example shown the transaction identifier, in a primary key table.

Optionally, other information can be stored in the primary key table as well, especially if the primary key table is not reset after each synchronization period; in such instances, for example a timestamp or flag may also be stored to manage which primary keys are associated with records yet to be synchronized in a particular time period. In the example shown, only transactions having transaction identifiers 2-5 are included in the primary key table (presumably since the record associated with transaction identifier 1 was previously synchronized).

As illustrated, a streaming dataset 120 is formed based on the primary keys in the primary key table that are identified as being associated with records required to be synchronized. In the example shown, the streaming dataset 120 includes a record associated with each of the primary keys in the primary key table 114 that are required to be synchronized to the analysis database. However, as compared to the transaction records in the transactional database 112, the streaming dataset 120 may include less information (as shown) or masked information to avoid exposing personally-identifiable information in the analysis database (e.g., corporate database 126).

Figure 5:
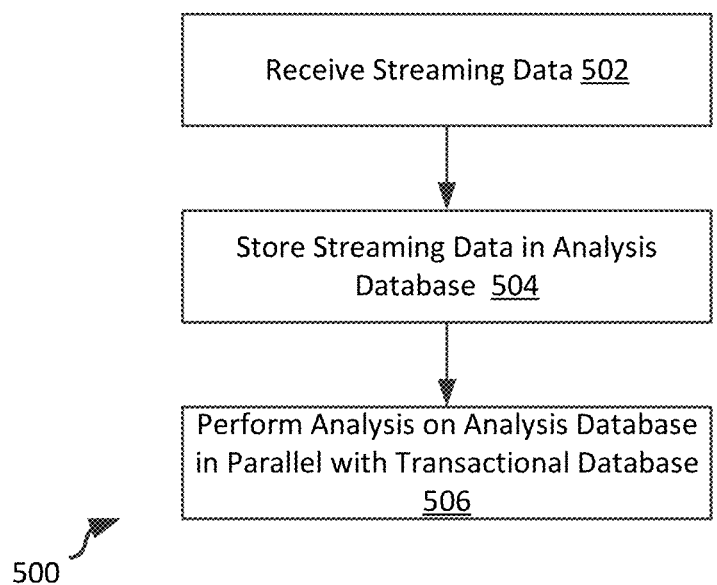
FIG. 5 is a flowchart of a method of ingesting and using data at an analysis database, according to an example embodiment of the present disclosure.

Referring now to FIG. 5, a flowchart of a method 500 of ingesting and using data at an analysis database is shown. The method 500 can be performed, for example, at enterprise computing infrastructure hosting an analysis database, such as infrastructure 104 hosting corporate database 126. In the embodiment shown, the method 500 includes receiving a streaming dataset, e.g., from one or more transactional database locations (step 502). The streaming data in each streaming dataset can be stored in the analysis database (step 504), allowing a user to utilize any of a plurality of different analysis tools to analyze the transactional data in near-realtime (step 506).

It is noted that, in some embodiments, receiving the streaming dataset can be performed in response to a request sent from the enterprise computing infrastructure to remote transactional database management systems, with the streaming dataset sent in response. In other embodiments, the streaming dataset is published by a synchronization tool at the locations of the transactional database management systems.

Referring to FIGS. 1-5 generally, it is noted that there are a number of advantages of the present methodology of synchronizing data between transactional database systems and an analysis database that is remotely located from those transactional database systems. Because of the typically limited bandwidth between those systems, in instances where the transactional database system receives a high volume of transactions, maintaining realtime synchronization of data can be difficult. Using periodically aggregated streaming data tracked using triggers instantiated in the transactional database management system allows for near-realtime synchronization of data between geographically disparate databases, while accommodating periods of time where transaction record frequency is greater than bandwidth between such transactional databases and an analysis database may allow.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A data management computing system comprising:
    a computing platform, including:
        a processor;
        a memory communicatively coupled to the processor;
        a transactional database comprising a plurality of transaction records hosted by a transactional database management system on the computing platform,
        a primary key table managed within the transactional database;
        one or more triggers instantiated in the transactional database management system, the one or more triggers being configured to cause the transactional database management system to store, for each transaction record written to the transactional database, a primary key in the primary key table;
        a synchronization tool installed on the computing platform hosting the primary key table, the synchronization tool configured to periodically obtain a collection of aggregated primary keys, the aggregated primary keys being primary keys stored in the primary key table within a predetermined period of time and associated with transaction records written to the transactional database within the predetermined period of time; and a streaming data service configured to receive a portion of each of the transaction records associated with the aggregated primary keys, the streaming data service being triggered by the synchronization tool and causing transmission of a streaming dataset to an analysis database hosted on a second computing platform that is located remotely from the computing platform hosting the transactional database, wherein the computing platform and the second computing platform are communicatively connected via a network that has a maximum available bandwidth that is below what would be required to replicate all transaction data from the transaction database into the analysis database; and wherein the synchronization tool is configured to modify at least one of: a portion of the transaction records or the predetermined period, based at least in part on the maximum available bandwidth.

2. The data management computing system of claim 1, further comprising a plurality of transactional databases hosted on a plurality of computing platforms, the plurality of transactional databases storing inventory transaction records from different enterprise locations within an enterprise.

3. The data management computing system of claim 1, wherein the second computing platform includes a streaming data ingest service configured to receive the streaming dataset and provide the portion of each of the transaction records to the analysis database.

4. The data management computing system of claim 1, wherein the transaction records in the transactional database includes sensitive information comprising at least one of financial information and personally-identifiable information, and the portion of the transaction records included in the streaming dataset lacks the sensitive information.

5. The data management computing system of claim 1, wherein the plurality of transaction records comprise inventory records for a retail organization.

6. A method of managing synchronization among data warehouses, the method comprising:

establishing a trigger within a transactional database storing a plurality of transaction records, the trigger having a trigger condition associated with storing a new transaction record in the transactional database;

in response to each occurrence of the trigger condition, storing a primary key of the new transaction record into a primary key table;

aggregating transaction record information into a transaction dataset, the transaction record information being from each of a plurality of transaction records that are associated with primary keys stored in the primary key table during a predetermined time period; and transmitting the transaction dataset to a remote analysis database as streaming data, wherein the remote analysis database and the transactional database are communicatively connected via a network that has a maximum available bandwidth that is below what would be required to transmit the whole transaction dataset from the transactional database to the remote analysis database; and wherein transmitting the transaction dataset includes modifying at least one of: a portion of the transaction records or the predetermined time period, based at least in part on the maximum available bandwidth.

7. The method of claim 6, wherein the trigger condition is defined to initiate storage of the primary key in response to storing the transaction record in the transactional database.

8. The method of claim 6, wherein the trigger condition is defined to initiate storage of the primary key in response to receipt of the transaction record at the transactional database.

9. The method of claim 6, wherein aggregating the transaction record information includes, after aggregating the transaction record information, deleting the primary keys stored in the primary key table during the predetermined time period.

10. The method of claim 6, wherein the plurality of transaction records comprise inventory records used in association with warehouse management software.

11. The method of claim 6, further comprising receiving the transaction dataset at a streaming data ingest service associated with the remote analysis database.

12. The method of claim 11, further comprising storing the transaction dataset in the remote analysis database.

13. The method of claim 12, further comprising receiving a plurality of transaction datasets at the streaming data ingest service from a plurality of transactional databases, the plurality of transactional databases being instantiated on computing systems remotely located from each other and from the analysis database.

14. The method of claim 6, further comprising providing data to at least one analysis application from the analysis database.

15. A data management computing system comprising:

a computing platform, including:
 a processor;
 a memory communicatively coupled to the processor;
a plurality of transactional databases each comprising a plurality of transaction records hosted by a transactional database management system, the transaction records comprising inventory management records;
a primary key table associated with each transactional database of the plurality of transactional databases, the primary key table managed within the associated transactional database;
one or more triggers instantiated in each transactional database management system, the one or more triggers being configured to cause the transactional database management system to store, for each transaction record written to the transactional database managed by that transactional database management system, a primary key in the associated primary key table;
an analysis database hosted remotely from the plurality of transactional databases and communicatively connected to the plurality of transactional databases via a network, wherein the network has a maximum bandwidth between the computing platform and the second computing platform that is below what would be required to replicate all transactional data from the plurality of transactional databases into the analysis database in realtime;
a plurality of synchronization tools, each synchronization tool being associated with a different one of the plurality of transactional databases and hosting the primary key table, the plurality of synchronization tools each configured to periodically obtain a collection of aggregated primary keys, the aggregated primary keys being primary keys stored in the primary key table of the associated transactional database within a predetermined period of time;

a plurality of streaming data services, each streaming data service being associated with a different one of the plurality of transactional databases and configured to receive a portion of each of the transaction records associated with the aggregated primary keys of the associated transactional database, the streaming data service being triggered by the associated synchronization tool and causing transmission of a streaming dataset to an analysis database located remotely from the transactional database; and a streaming data ingest service configured to receive each of the streaming datasets associated with the plurality of transactional databases and provide the portion of each of the transaction records to the analysis database;

wherein the analysis database maintains a set of analysis records corresponding to the plurality of transaction records at each of the plurality of transactional databases on an at least near-realtime basis.

16. The data management computing system of claim 15, wherein each synchronization tool performs at least one of stripping information or masking information from the plurality of transaction records to form the associated streaming dataset.

17. The data management computing system of claim 15, wherein the plurality of streaming data services are configured to push each streaming dataset to the streaming data ingest service.

* * * * *